(12) United States Patent
Sparks et al.

(10) Patent No.: US 6,594,413 B2
(45) Date of Patent: Jul. 15, 2003

(54) OPTICAL SWITCHING DEVICE

(75) Inventors: Adrian Sparks, Ongar (GB);
Frederick J Lalonde, Ottawa (CA);
Peter D Roorda, Ottawa (CA)

(73) Assignee: Nortel Networks Limited, St. Laurent (CA)

(*) Notice: Subject to any disclaimer, the term of this patent is extended or adjusted under 35 U.S.C. 154(b) by 15 days.

(21) Appl. No.: 09/750,871

(22) Filed: Dec. 28, 2000

(65) Prior Publication Data

US 2002/0085798 A1 Jul. 4, 2002

(51) Int. Cl.[7] .............. G02B 6/12; G02B 6/26; G02F 1/29
(52) U.S. Cl. .................. 385/18; 359/320
(58) Field of Search ............. 385/18, 21, 17, 385/31, 33, 16; 359/291, 320, 349, 629, 639, 315, 318

(56) References Cited

U.S. PATENT DOCUMENTS

| | | | |
|---|---|---|---|
| 4,504,121 A | * | 3/1985 | Carlsen et al. .......... 359/247 |
| 5,504,772 A | * | 4/1996 | Deacon et al. .......... 372/102 |
| 5,943,454 A | * | 8/1999 | Aksyuk et al. .......... 385/140 |
| 6,160,665 A | * | 12/2000 | Yuan .......... 359/629 |
| 6,320,993 B1 | * | 11/2001 | Laor .......... 385/16 |
| 6,337,760 B1 | * | 1/2002 | Huibers et al. .......... 359/291 |
| 2002/0012168 A1 | * | 1/2002 | Ll .......... 359/487 |
| 2002/0021859 A1 | * | 2/2002 | Briggs .......... 385/17 |

OTHER PUBLICATIONS

"Free-Space Micromachined Optical Switches for Optical Networking" L.Y Lin, E.L Goldstein, R.W Thatch, IEEE Journal of Selected Topics in Quantum Electronices, vol. 5, No. 1 Jan./Feb. 1999.

* cited by examiner

Primary Examiner—Chandrika Prasad
(74) Attorney, Agent, or Firm—Barnes & Thornburg

(57) ABSTRACT

An optical switch comprising two segments at least partially separated by a surface that is partially reflective and partially transmissive to the optical signals being switched, each segment having at least one optical input and at least one optical output, the segments being arranged such that an optical signal can be switched from said input to said output by reflection from said surface, with the optical signal that is generated by transmission through said surface being directed to an output of the other segment.

14 Claims, 4 Drawing Sheets

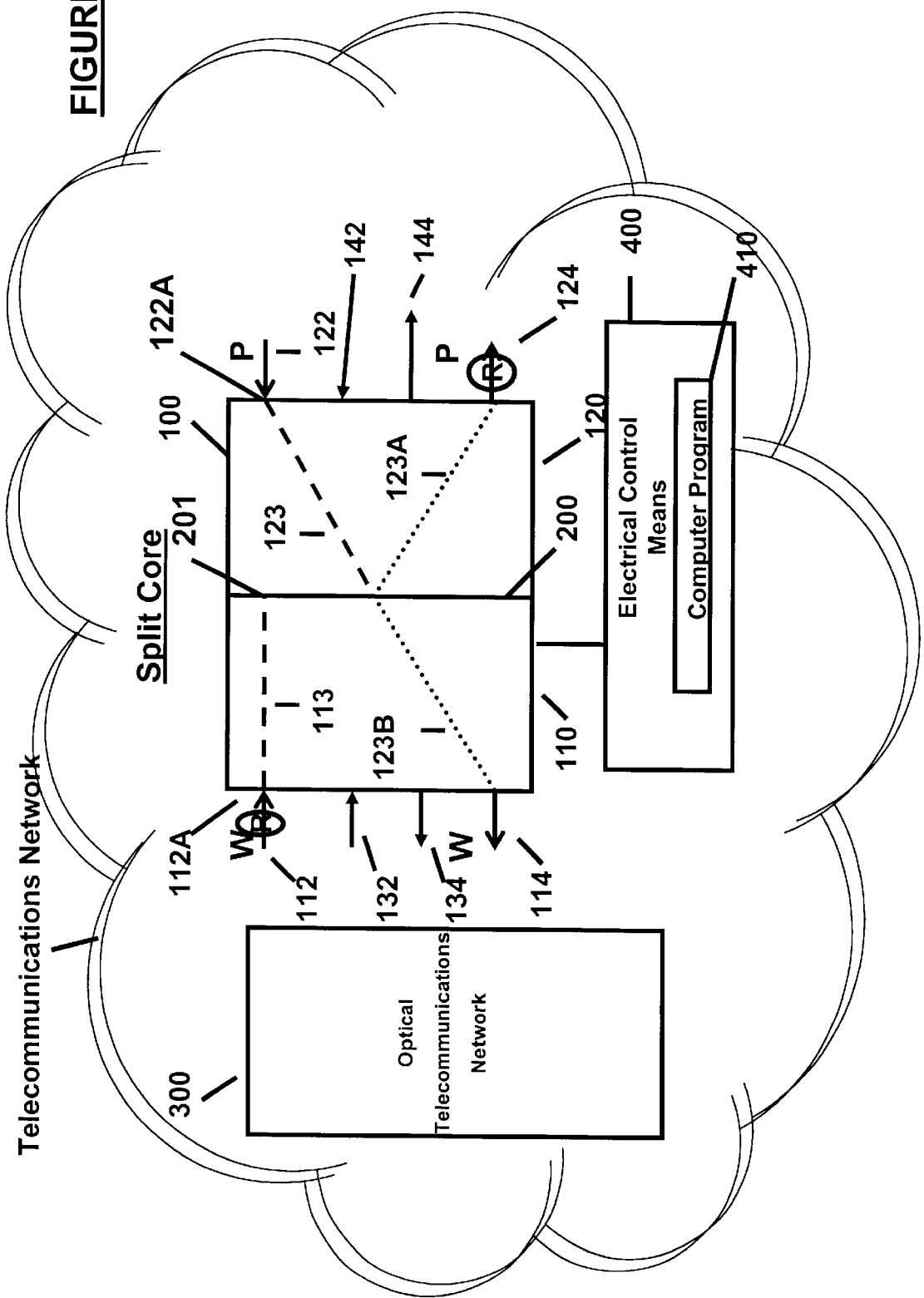

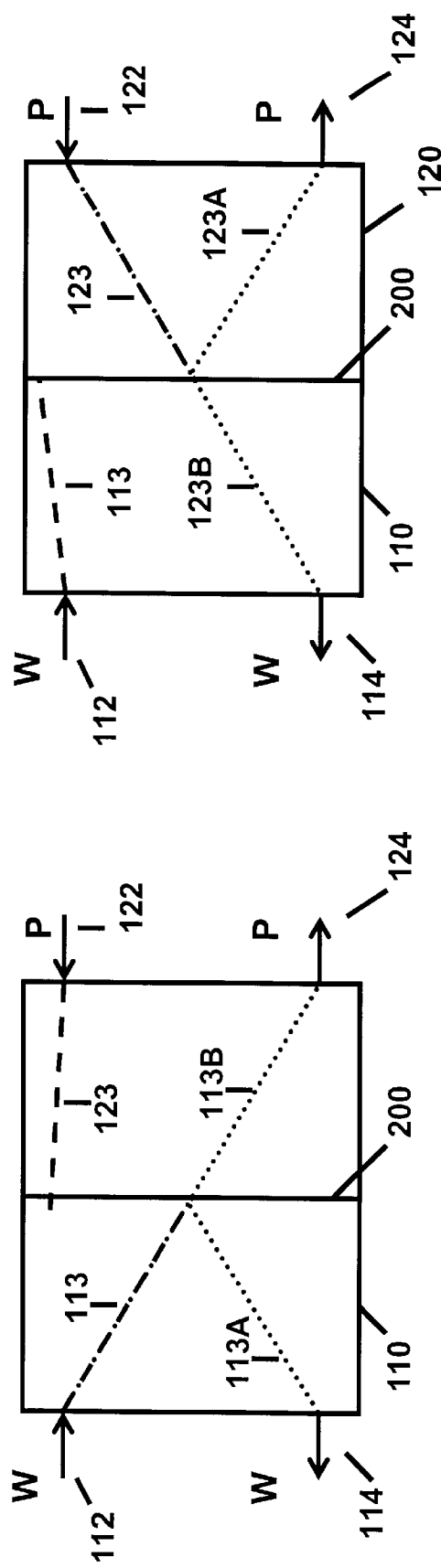

OPTICAL SWITCHING DEVICE

FIELD OF THE INVENTION

The present invention relates to an optical switch, and in particular to an optical switch arranged to provide a copy of the optical signal being switched.

BACKGROUND OF THE INVENTION

Many industries utilise optical switches in their equipment. For instance, the telecommunications industry utilises optical switches in optical dedicated protection and optical shared protection rings (OSPR's). Optical transmission systems are often constructed with a fault recovery mechanism so that if there is a complete loss of transmission capability due to component and/or transmission line failure, the traffic can be reallocated to other physically diverse routes. Pending U.S. application Ser. No. 09/349,349 (incorporated herein by reference) describes such as OSPR system.

Switches are commonly incorporated in OSPR's at network nodes. At a network node, a 2×2 switch may be utilised to connect between working and protect transmitters/receivers and working and protect transmission lines. Although the OSPR is designed with a fault recovery mechanism, performance of the node will be seriously affected if a switch fails, or has to be removed for maintenance or in order to be replaced. In such an instance, switch failure maintenance can interrupt both working and protection traffic.

FIG. 1 shows a working (2) and protect (4) transmission line connected to respective working and protect receivers (6,8) via a 2×2 switch (10). Similarly, the working and protect transmission lines (2',4') may be connected to the working and protect transmitters (6',8') via a 2×2 switch (10'). Alternatively, a bi-directional 2×2 switch and a combination transmitter/receiver can be used before the outgoing and incoming paths are routed to transmitter and receiver respectively. This allows these two switches to be combined into one (not shown).

A 2×2 switch allows independent connection of working and protection optical channels (or transmission lines) to working or protection receiver or transmitter as appropriate. This functionality is required in both 1+1 (in which the same data is simultaneously transmitted along both the working and protection lines, providing redundancy in the event of either of the lines failing) and 1:1 protection switching (in which high priority data is typically transmitted along the working line, low priority data along the protect line; in the event of the working line failing, the high priority data is routed along the protect line).

FIG. 2 shows how such bi-directional 2×2 switches may be incorporated into an OSPR module 20, which includes an optical cross connect (O×C) 22. The O×C contains optical switches to route traffic off and on the shared protection as described in U.S. application Ser. No. 09/349,349. An OSPR will be comprised of a number of such modules or nodes.

The above description is merely an example of how such an optical switch can be used. Many systems, not limited to telecommunications may utilise such optical switching arrangements. The failure of a switch, or a part of the switch, inevitably affects connectivity between the inputs and outputs, as does removal of the switch for repair or maintenance.

SUMMARY OF THE INVENTION

In a first aspect, the present invention provides an optical switch comprising two segments at least partially separated by a surface that is partially reflective and partially transmissive to optical signals being switched, each segment having at least one optical input and at least one optical output, the segments being arranged such that an optical signal can be switched from said input to said output by reflection from said surface, with the optical signal that is generated by transmission through said surface being directed to an output of the other segment.

Thus a copy of an incident optical signal can be automatically generated by the switch. This allows fast end to end protection to continue to operate in the presence of multiple failures of the network e.g. the failure of more than one path within the network. If an output fails, then the copy of the signal is already provided to another output for onward transmission.

Preferably each segment comprises a plurality of said inputs and a plurality of said outputs.

Preferably said surface is substantially 50% reflective and 50% transmissive in respect of the wavelength of the optical signal being switched. Thus incident signals will be split into two roughly equal components.

Preferably the switch further comprises beam steering means arranged to controllably switch the optical signal from said inputs to said outputs. Thus the optical signal may be re-directed within the switch as desired e.g. to different outputs or beam stops.

Preferably each segment further comprises electrical control means arranged to control the operation of the switch, with each segment being electrically separate. By having electrically separate segments, a failure of the electrical control means to one segment need not affect the functionality of the other segments.

Preferably the switch includes at least one optically amplifying region arranged to amplify optical signals within said switch. Thus attenuation in the switch can be at least partially compensated for.

Preferably said amplifying region is coupled to said surface so as to amplify optical signals being transmitted through said surface. For instance, the surface or window could be at least in part formed as a slab of amplifying material. Such a slab could form the window, or be part of a more complex structure forming the window e.g. a planar waveguide. Alternatively, one or more amplifying regions could be located elsewhere within the switch e.g. coupled to an input or an output.

Preferably the input and output positions of one of the segments are substantially the mirror image of the input and output positions of the second segment. This permits a relatively simple, reciprocal structure of the switch. If such a structure is not utilised, further internal optical beam directing means such as mirrors or waveguides may be required to direct the internal signals to the desired output.

In another aspect the invention provides a telecommunications network arranged to transmit optical signals comprising a switch.

Preferably the network includes at least one working and one protect channel each arranged to carry optical signals, with the optical signal of the working channel being input to the first segment of the switch, and the protect channel being input to the other segment.

In another aspect the present invention provides a telecommunications network arranged to transmit optical signals and comprising a plurality of switches as claimed in claim 1, wherein said switches are arranged to provide ladder type protection.

In a further aspect the present invention provides a computer program arranged to control the operation of a switch.

In another aspect the present invention provides a segment for an optical switch comprising a surface that is partially reflective and partially transmissive, the segment comprising at least one input and at least one output and being arranged to transmit optical signals from said input to said output by reflection from the surface.

In a further aspect the present invention provides method of switching an optical signal from at least one input to at least one output by reflecting the signal from a surface that is partially transmissive and partially reflective, with a portion of the optical signal that is transmitted through the surface being directed to a further output.

BRIEF DESCRIPTION OF THE DRAWINGS

In order to show how the invention may be carried into effect, embodiments of the invention are now described below by way of example only and with reference to the accompanying figures in which:

FIG. 3 illustrates a 2×2 switch according to an embodiment of the present invention; and FIGS. 4A and 4B illustrate respectively the normal operation of the switch shown in FIG. 3 in a 1+1 protection scheme, and the operation in the event of a failure of the working path.

DETAILED DESCRIPTION OF THE PREFERRED EMBODIMENTS

Figure 1:
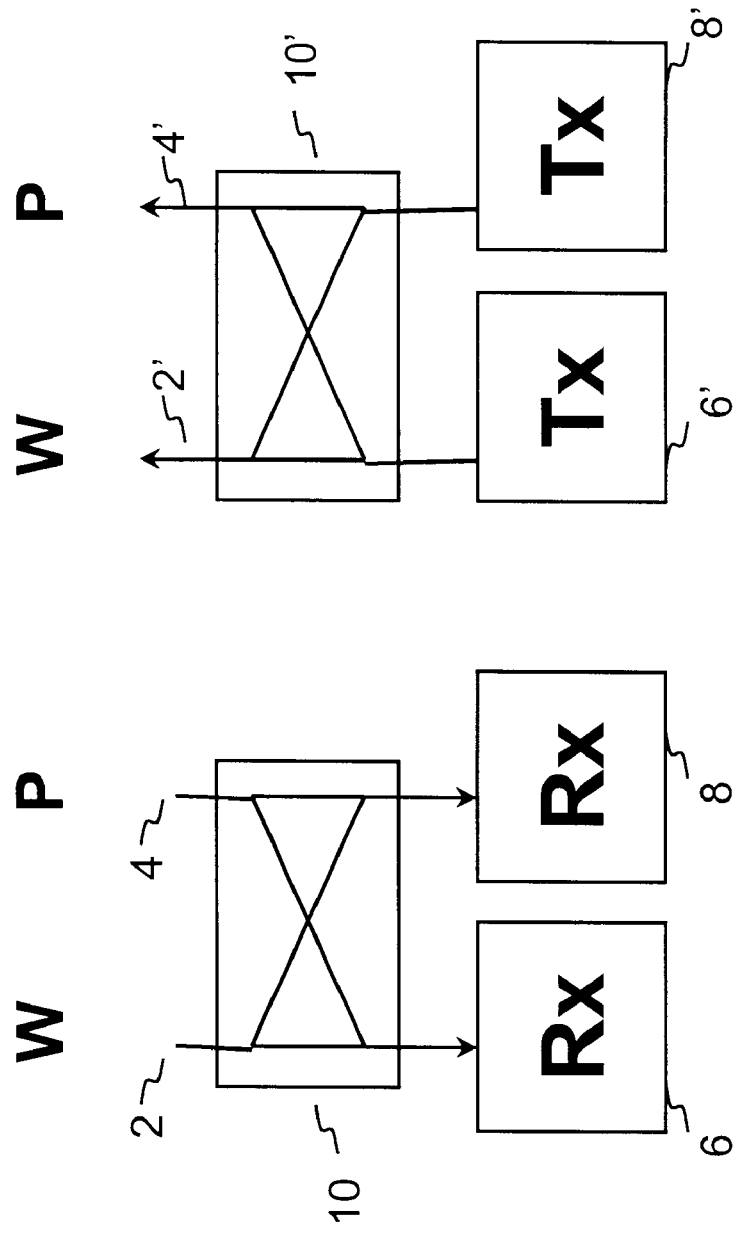
FIG. 1 illustrates the typical connections of a 2×2 switch in an OSPR (prior art)
Figure 2:
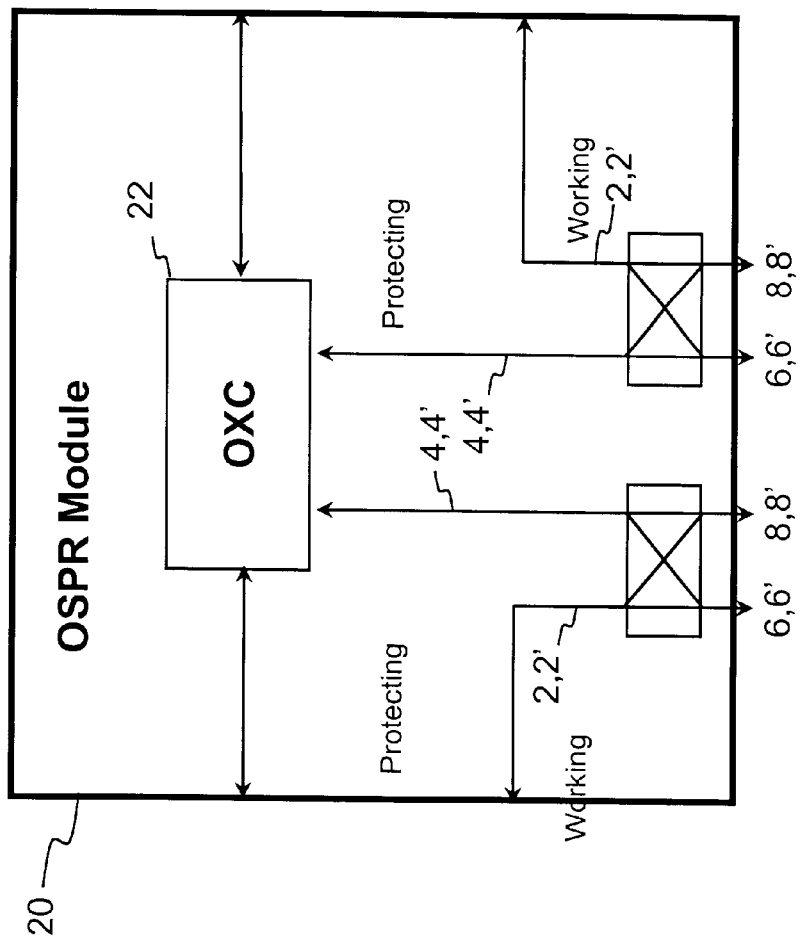
FIG. 2 illustrates an OSPR module (prior art)

FIG. 3 illustrates a communications network including an optical switch 100 comprising two segments 110, 120.

The first segment 110 has an input shown as connect to an incoming working channel 112 on an optical network 300, and an output connected to the outgoing working channel 114.

The second segment or module 120 has a first input shown as connected to an incoming protection channel 122, and a first output shown as connected to an outgoing protection channel 124. Each segment many also have one or more additional inputs (132, 142) and outputs (134, 144).

Separating the two segments is a surface 200 that is partially transmissive and partially reflective to incident optical signals. Such a surface 200 or window could take the form of a semi-silvered mirror, such as might be formed by the appropriate coating of a glass.

Each segment further comprises respective optical beam steering means (112A, 122A) arranged to controllably direct the optical signals 113, 123 received via the respective inputs. Such a beam steering means could be implemented in a number of ways.

For instance, it could take the form of the optical switches described in "Free-Space Micromachined Optical Switches for Optical Networking" L. Y Lin, E. L Goldstein, R. W Thatch, IEEE Journal of Selected Topics in Quantum Electronics, Vol. 5, No. 1. January/February 1999. For instance, FIG. 3 shows the optical signal 113 from the working path 112 being directed by the beamsteering means in 110 to an optical sink (not shown). The beamsteering means in segment 120 is directing the optical signal 123 from the protection path 122 so as to be instant upon the partially reflective, partially transmissive surface 200. Such that the reflected portion 123A of the signal 123 is directed to the outgoing protection path 124.

The two segments posses mirror symmetry about the axis substantially defined by the surface 200. Consequently, the transmitted portion 123B of the optical signal 123 is directed to the mirror image of the output to which signal 123A is directed. Thus the signal 123B is directed to the outgoing working path 114.

Such a optical switch can be used to sustain simultaneous failures of either input port and either output port. This is contrast to the prior art, which can normally sustain either an input port or an output port.

FIG. 4a shows the normal operation of a switch in an optical network utilising 1+1 protection switching. The signal 113 from the incoming working path is directed to reflect off the surface 200 such that a portion of the signal 113A is directed to the outgoing working path 114. The fraction of the signal 113B transmitted through the window 200 is output to the outgoing protection path 124. Any incoming signal 123 from the incoming protection path 122 is directed to an optical sink so that the optical signal 123 does not cause any interference with any of the other outputs.

In the event that the signal from the working path 112 fails or is degraded, then the optical signal 123 from the protect path is used to provide both outputs as shown in FIG. 4B. The signal 113 from the working path is directed to an optical sink (not shown). The optical signal 123 from the protect path 122 is directed to reflect off the surface 200, with the reflective portion 123A being directed to the protect path output 124 and the transmitted portion 123B being directed to the working path output 114.

It will be appreciated that such a protection scheme is particularly suited to a ladder type operation.

Such a protection scheme is described in pending U.S. application Ser. No. 09/557,890, "Optical Communications Network", assigned to Nortel Networks and incorporated herein by reference. A network incorporating such a protection scheme would comprise at least two nodes linked by diverse main and optical protection paths, at least one of the nodes coupling selected data onto the main path and the protection path for reception by the other of the nodes. A switching arrangement is provided between the two nodes for enabling switching of a signal on one of the paths, such that traffic can cross between the main and protection paths at the location of the or each switching arrangement. This arrangement is quite often termed a ladder arrangement, as the main and protection optical paths are analogous to the uprights on a ladder, with the switching arrangements between the main and protection paths being analogous to the rungs of a ladder.

Such a scheme provides a communications network between two nodes, in which 1+1 protection is provided, and is supplemented by control of the switching signals between the working and the protection paths of the 1+1 protection at intermediate locations. This enables a sinuous communication path to be established, so that communication can be maintained even the event of multiple failures affecting both the working and protection paths, when such failures occur in different intermediate stands of the network. The defined main and protection paths can remain fixed during communication, so that switching can be carried out with low computation effort.

Whilst the preferred embodiment has been described with reference to a specific implementation of the switch, it will be appreciated that the invention may be implemented in a number of alternative ways.

For instance, whilst the present invention has been described as having a single input and a single output in respect of each segment, it will be appreciated that each segment may have a plurality of inputs or outputs as desired, with suitable beamsteering means arranged to provide the desired connectivity between the inputs and outputs of the respected segments.

Whilst the window 200 in the preferred embodiment is 50% reflective and 50% transmissive, it will be appreciated that any desired ratio of transmissive to reflective characteristics could be utilised. Equally, the medium forming the window could comprise a controllably variable reflective substance, such that the reflective and transmissive characteristics are altered as required.

If desired, one or more optical amplifying regions could be incorporated into the switch so as to amplify the optical signals, either before or after the signal has bee incident upon the surface 200. If desired, such an amplifying region 201 could comprise a portion of the surface 200.

The purpose of this specification, the terms "optical" and "light" should be understood as pertaining not only to the visible part of the electromagnetic spectrum, but also to the infra-red and ultra-violet parts that bound the visible part.

Any range or device given herein may be extended or altered without loosing the effects sought, as will be apparent to a skilled person from an understanding of the teaching herein.

What is claimed is:

1. An optical switch for selecting one of a number of input optical signals and splitting the selected optical signal into two portions, the switch comprising two segments at least partially separated by a surface that is partially reflective and partially transmissive to optical signals being switched, such that the selected optical signal is incident on said surface to be split into a reflected portion and a transmitted portion, each segment having at least one optical input and at least one optical output, the segments being arranged such that the selected optical signal can be switched from the optical input of either one of the segments onto said surface so that the reflected portion is reflected to the optical output of the same segment, and the transmitted portion is directed to the optical output of the other segment.

2. A switch as claimed in claim 1, wherein each segment comprises a plurality of said inputs and a plurality of said outputs, the segments being arranged such that an optical signal can be switched from any of the inputs to any of the outputs in a segment by reflection from said surface, with the optical signal that is generated by transmission through said surface being directed to one of the outputs of the other segment.

3. A switch as claimed in claim 1, wherein said surface is substantially 50% reflective and 50% transmissive in respect of the wavelength of the optical signal being switched.

4. An optical switch as claimed in claim 1, further comprising beam steering means arranged to controllably switch the optical signal from said inputs to said outputs by steering the direction of the beam of the optical signal received at one of said inputs.

5. A switch as claimed in claim 1, wherein each segment further comprises electrical control means connected to the respective segment and arranged to control the operation of the switch, with each segment being electrically separate.

6. A switch as claimed in claim 1, further comprising at least one optically amplifying region within said switch arranged to amplify optical signals transmitted through the amplifying region.

7. A switch as claimed in claim 6, wherein said amplifying region is coupled to said surface so as to amplify optical signals being transmitted through said surface.

8. A switch as claimed in claim 1, wherein the input and output positions of one of the segments are substantially the mirror image of the input and output positions of the second segment.

9. A telecommunications network arranged to transmit optical signals, the network comprising a switch as claimed in claim 1, the optical switch being arranged to receive and switch an optical signal being transmitted through the network.

10. A network as claimed in claim 9, comprising at least one working and one protect channel each arranged to carry optical signals, with the optical signal of the working channel being input to the first segment of the switch, and the protect channel being input to the other segment.

11. A telecommunications network arranged to transmit optical signals and comprising a plurality of switches as claimed in claim 1, wherein said switches are arranged to provide ladder type protection.

12. A computer program arranged to control the operation of a switch as claimed in claim 1, the computer program being arranged to control the switching of optical signals received by the switch.

13. A segment for the optical switch of claim 1, comprising the surface that is partially reflective and partially transmissive, the segment comprising at least one optical input and at least one optical output and being arranged for selectively directing the optical input signal onto the surface for splitting into the reflected portion and the transmitted portion.

14. A method of using the optical switch of claim 1 for switching an optical signal from at least one input to at least one output by switching the selected optical signal onto the surface for splitting into the reflected portion and the transmitted portion.

* * * * *